United States Patent
Sun et al.

(10) Patent No.: US 10,922,453 B2
(45) Date of Patent: Feb. 16, 2021

(54) GROMACS CLOUD COMPUTING PROCESS CONTROL METHOD

(71) Applicant: SHENZHEN JINGTAI TECHNOLOGY CO., LTD., Guangdong (CN)

(72) Inventors: Guangxu Sun, Guangdong (CN); Chunwang Peng, Guangdong (CN); Mingjun Yang, Guangdong (CN); Hui Xiao, Guangdong (CN); Yang Liu, Guangdong (CN); Jian Ma, Guangdong (CN); Lipeng Lai, Guangdong (CN); Shuhao Wen, Guangdong (CN)

(73) Assignee: SHENZHEN JINGTAI TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/472,204

(22) PCT Filed: May 10, 2018

(86) PCT No.: PCT/CN2018/086316
§ 371 (c)(1),
(2) Date: Jun. 21, 2019

(87) PCT Pub. No.: WO2019/134322
PCT Pub. Date: Jul. 11, 2019

(65) Prior Publication Data
US 2020/0134246 A1    Apr. 30, 2020

(51) Int. Cl.
G01N 33/48    (2006.01)
G01N 33/50    (2006.01)
(Continued)

(52) U.S. Cl.
CPC ............ *G06F 30/20* (2020.01); *G06F 9/4881* (2013.01); *G06F 17/15* (2013.01); *G06F 2111/02* (2020.01); *G06F 2111/20* (2020.01)

(58) Field of Classification Search
CPC ........ G06F 30/20; G06F 9/4881; G06F 17/15; G06F 2111/02; G06F 2111/20
See application file for complete search history.

(56) References Cited

U.S. PATENT DOCUMENTS

| 2013/0268652 A1 | 10/2013 | Hugard, IV et al. |
| 2016/0267219 A1 | 9/2016 | Mackerell et al. |

FOREIGN PATENT DOCUMENTS

| CN | 103294483 | 9/2013 |
| CN | 103714006 | 4/2014 |

OTHER PUBLICATIONS

"International Search Report (Form PCT/ISA/210) of PCT/CN2018/086316," dated Feb. 11, 2019, pp. 1-2.

*Primary Examiner* — Russell S Negin
(74) *Attorney, Agent, or Firm* — JCIP Global Inc.

(57) ABSTRACT

A GROMACS cloud computing process control method includes the following steps. Step (1): acquire crystal structures having energy ranked at the top by cluster ranking, and then obtain a GROMACS structural file. Step (2): acquire optimal force field parameters, and then automatically convert the optical force field parameters into a GROMACS force field parameter file. Step (3): import the yoda library function to automatically generate a corresponding GROMACS simulation parameter file according to simulation types in different stages. Step (4): import a mixc library function to submit GROMACS computation and analysis tasks to a task scheduling platform called Majorana. Step (5): add a corresponding monitor task for the same batch of tasks for each structure, and acquire the execution status of the tasks in real time. Step (6): acquire corresponding (Continued)

analysis results from ArangoDB after all the tasks are executed, and directly plot corresponding curves in Jupyter.

6 Claims, 7 Drawing Sheets

(51) Int. Cl.
    *G06F 30/20*     (2020.01)
    *G06F 9/48*     (2006.01)
    *G06F 17/15*     (2006.01)
    *G06F 111/02*     (2020.01)
    *G06F 111/20*     (2020.01)

GROMACS CLOUD COMPUTING PROCESS CONTROL METHOD

CROSS-REFERENCE TO RELATED APPLICATION

This application is a 371 of international application of PCT application serial no. PCT/CN2018/086316, filed on May 10, 2018. The entirety of the above-mentioned patent application is hereby incorporated by reference herein and made a part of this specification.

BACKGROUND OF THE INVENTION

1. Technical Field

The invention belongs to the field of high-flux GROMACS scientific computation, and relates to a GROMACS cloud computing process control method.

2. Description of Related Art

Molecular dynamics (MD) simulation has been widely applied to various fields of material science. As efficient open-source software, GROMACS has become the first choice for MD simulations. At present, almost all supercomputer centers and cloud platforms are equipped with GROMACS of various versions, and corresponding operation management systems are adopted to fulfill submission, modification, deletion, and the like of tasks.

Existing GROMACS cloud computing processes mainly have the following defects:

1. Incapable of cross-platform scheduling: as for almost all existing GROMACS cloud computing platforms, manual login is needed, and task scripts are manually written and are then submitted to the platforms for computation.

2. Incapable of continuous computation: in most cases, the final structure of the previous GROMACS task is used in the next GROMACS task, and consequentially, continuous tasks cannot be submitted until computation of the previous task is completed.

3. Simpleness in storage: all GROMACS computation and analysis results are stored in platforms, so that the results cannot be checked in real time, and the simulation statues cannot be monitored.

4. Lack of user interfaces: all existing GROMACS cloud computing and analyzing processes are based on scripts, which results in poor user experience and is not beneficial to monitoring of the task status, graphical display of results, or the like.

BRIEF SUMMARY OF THE INVENTION

In order to overcome the above defects, the invention provides a GROMACS cloud computing process control method which includes the following steps:

Step (1): acquiring, from ArangoDB, .res or .cif files with crystal structures having energy ranked at the top by cluster ranking, and then importing a yoda library function to carry out symmetric operations, format conversion and unit cell expansion, so that a GROMACS structural file is obtained;

Step (2): acquiring, from ArangoDB, optimal force field parameters .prm and .rtf obtained by force field development, and then importing the yoda library function to automatically convert the optical force field parameters .prm and .rtf into a GROMACS force field parameter file;

Step (3): importing the yoda library function to automatically generate a corresponding GROMACS simulation parameter file according to simulation types in different stages;

Step (4): importing a mixc library function to submit GROMACS computation and analysis tasks to a task scheduling platform called Majorana;

Step (5): adding a corresponding monitor task for the same batch of tasks for each structure, and acquiring the execution status of the tasks in real time; and Step (6): acquiring corresponding analysis results from ArangoDB after all the tasks are executed, and importing matplotlib to directly plot corresponding curves in Jupyter.

In the prior art, three indispensable files for GROMACS simulation include the structure (.gro), force field parameters (.top and .itp), and simulation parameters (.mdp). The method in this disclosure is used for temperature-dependent stability computation (free energy computation) of crystals in the crystal structure prediction process, wherein the structure is obtained according to a cluster ranking result (.res and .cif) in the crystal structure prediction process, the force field parameters are obtained according to force field development results, and the analog parameters are obtained with reference to existing literature reports and relevant test and optimization results (a corresponding parameter file is automatically generated according to different simulation types). Therefore, the invention realizes seamless cohesion of force field development, cluster ranking and free energy computation in the crystal structure prediction process.

By adoption of this technical solution, complicated cross-platform and cross-software steps of platform login, task script writing, analysis script writing, task monitoring, data analysis, plotting and the like can be avoided, and all user operations are integrated in Jupyter, so that the computation and analysis efficiency is greatly improved.

Preferably, task parameters are at least one selected from task type, image name, memory and number of cores.

Preferably, the task type is MD or REMD.

Preferably, in Step (5), the execution status includes at least one selected from DONE, RUNNING, FAILED, IN_PREP, IN_QUEUE, and FALAT.

Correspondingly, the invention further provides a replica-exchange molecular dynamics process method based on GROMACS cloud computing. The method includes the following steps:

Step ①: selecting N low-energy crystal structures from a cluster ranking computation result, and carrying out format conversion and unit cell expansion to obtain a corresponding GROMACS structure, wherein the N low-energy crystal structures are 5-10 crystal structures having energy ranked at the top;

Step ②: selecting optimal force field parameters, and carrying out constant-pressure and constant-temperature relaxation on each structure for 1 ns, wherein the optimal force field parameters are parameters, known by those skilled in this field, that are able to best describe the structure-function relationship of molecules and that have good crystallographic performances;

Step ③: obtaining relaxed structures, and carrying out, under an NPT ensemble, temperature scanning for conventional molecular dynamics simulation at a series of given temperatures;

Step ④: carrying out REMD simulation under the NPT ensemble on final structures subjected to temperature scanning, and extracting the variations with time of common physical and chemical properties to directly plot, in Jupyter, an evolution landscape with time of a certain property under all the temperatures; and Step ⑤: working out curves of variations with temperature of the volume, internal energy and free energy according to REMD simulation results, calculating the correlation time and overlap matrix between every two adjacent temperatures while free energy is calculated by MBAR, and directly plotting all these data as curves in Jupyter for real-time checking and convergence inspection.

Preferably, in Step ⑤, convergence is monitored according to a diagram of variations with time of temperature, pressure, volume, energy, RMSD, drift of center of mass and the like in the simulation computing process, and the energy includes at least one selected from potential energy, kinetic energy, position restrain energy, electrostatic energy, Van der Waals interaction energy and total energy.

REMD simulation is mainly used for enhancing sampling of a system in the configuration space, so that all points on a potential energy surface can be traversed to the maximum extent to obtain accurate free energy data. However, due to the fact that REMD simulation requires a large quantity of computation resources, task execution and source scheduling are complex. In view of this, the complete computation process is designed for REMD to realize rapid submission of REMD tasks and automatic analysis of the results.

By adoption of the above technical solution, the invention fulfills the following advantages: after an initial structure, force field parameters and simulation parameters (including step length, duration, temperature range and the like) of all steps are specified, submission only needs to be conducted once in this computation process, and then all subsequent computation and data analysis tasks can be automatically completed. Users can check and modify the execution status of the tasks in Jupyter at any time and can also graphically check computation and analysis results in real time.

The invention fulfills the following beneficial effects:

1. High-flux and highly-parallel cross-platform scheduling, automatic restarting and continuous computation of GROMACS tasks, as well as automatic analysis of results are realized.

2. Automatic creation of GROMACS structure files, GROMACS force field parameter files and GROMACS simulation parameter files, as well as automatic analysis and integration of common physical and chemical properties are realized.

3. Seamless cohesion of force field development, cluster ranking computation, and free energy computation in the crystal structure prediction process is realized; equilibrated structures, analysis results and GROMACS trajectories are separately stored, so that computation results can be rapidly obtained; and the result display speed and the convergence analysis speed are greatly increased.

4. The steps of creation, submission, and management of GROMACS tasks, monitoring of physical and chemical properties, result analysis, plotting and the like are all integrated in Jupyter, so that visual operations of the GROMACS cloud computing process are realized.

DETAILED DESCRIPTION OF THE INVENTION

Preferred embodiments of the invention are further detailed below with reference to the accompanying drawings.

Embodiment 1

Figure 1:
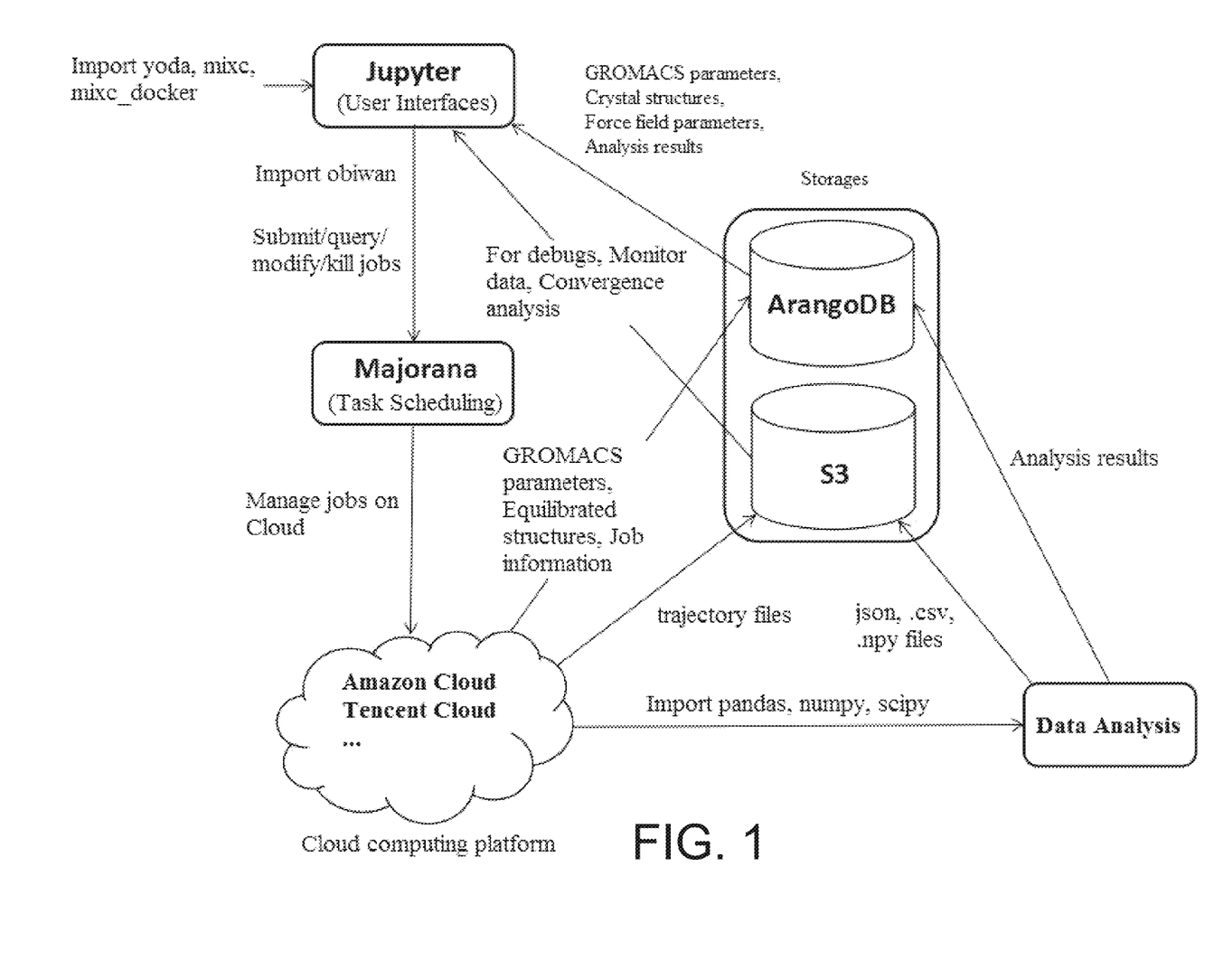
FIG. 1 is a diagram of a complete GROMACS cloud computing process of the invention.

As shown in FIG. 1, a complete GROMACS cloud computing process includes the following steps:

Step (1) .res or .cif files with crystal structures having energy ranked at the top by cluster ranking are acquired from ArangoDB, and then a yoda library function is imported to carry out symmetric operations, format conversion and unit cell expansion, so that a GROMACS structural file is obtained;

Step (2) Optimal force field parameters .prm and .rtf obtained by force field development are acquired from ArangoDB, and then the yoda library function is imported to automatically convert the optical force field parameters .prm and .rtf into a GROMACS force field parameter file;

Step (3) The yoda library function is imported to automatically generate a corresponding GROMACS simulation parameter file according to simulation types in different stages, wherein these parameters can be replaced with input parameters in the json format provided by users, so that controllable adjustment of the parameters is realized;

Step (4) A mixc library function is imported to submit GROMACS computation and analysis tasks to a task scheduling platform called Majorana.

These tasks include common MD simulation, replica-exchange molecular dynamics (REMD), trajectory recalculation, extending simulation time, continuing computation from a break point, multi-state Bennett acceptance ratio method rate (MBAR) of multi-dimensional data, and the like.

Task parameters are at least one selected from task type, image name, memory and number of cores.

Majorana submits tasks to a specified cloud computing platform (Amazon Cloud, Tencent Cloud or the like) according to the task parameters. For instance, whether or not cross-node parallelism is required is determined according to the task type (MD or REMD), and the cloud platform to which the tasks are to be submitted is selected according to the image name. Majorana acquires and records the execution status of the tasks in real time, so that users can check the execution status of the tasks by importing an obiwan library function.

The parameters and status of a specified task can be modified through the obiwan library function and handle of the tasks according to actual requirements. For instance, submitted task information can be checked through "list_job", standard error/output of the tasks can be acquired through "dump_job", recalculation can be realized through "rerun" (when a task is accidentally interrupted, automatic breakpoint restarting can be achieved), GROMACS input and output files can be acquired through "dump_file", the tasks can be deleted through "kill". These commands can automatically trigger Majorana to send corresponding instructions to the cloud platform, so that remote management of the tasks is realized.

Step (5) In order to achieve automatic and continuous computation of the tasks, a monitor task (joiner) is added for the same batch of tasks for each structure, so that the execution status of the tasks can be acquired in real time.

The execution status includes DONE, RUNNING, FAILED, IN_PREP, IN_QUEUE, and FALAT. Once all the tasks are DONE, a data analysis program (based on numpy, pandas, and scipy libraries) is imported to automatically calculate the variations with time of common physical and chemical properties (including energy, volume, temperature, pressure, RMSD, drift of center of mass and the like), free energy, correlation time, overlap matrix and the like, and task execution information, parameters, final structures and analysis results are stored in ArangoDB. Meanwhile, big-data trajectory files (.trr and .xtc), a .csv file of the evolution with time of the properties, convergence data (.npy file), and the like are uploaded to S3 (Simple Storage Service) (used for real-time monitoring of the variations of the parameters, debug, convergence analysis and the like). S3 can realize high-flux transmission of files, so that intermediate data can be downloaded and analyzed in real time. Finally, the next computation task is automatically submitted as needed. At this moment, the status of the joiner task becomes DONE, and a new joiner task is generated.

Step (6) Corresponding analysis results are acquired from ArangoDB after all the tasks are executed, and matplotlib is imported to directly plot corresponding curves in Jupyter, so that computation results can be checked visually.

Embodiment 2

Figure 2:
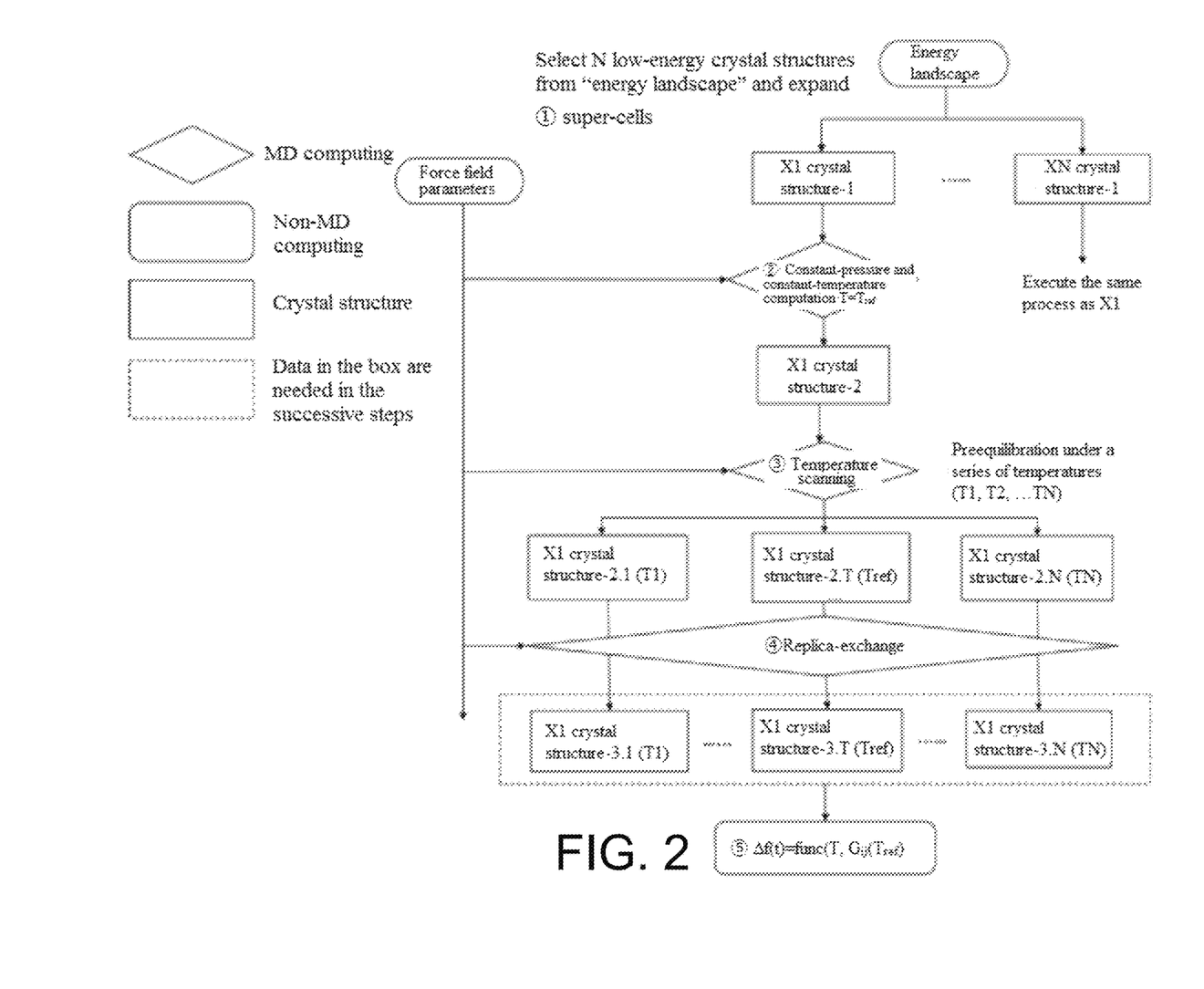
FIG. 2 is a diagram of a replica-exchange molecular dynamics process based on GROMACS cloud computing of the invention.

As shown in FIGS. 2-7, a replica-exchange molecular dynamics process method based on GROMACS cloud computing includes the following specific steps:

Step ①: N low-energy crystal structures are selected from a cluster ranking computation result (energy landscape), and format conversion and unit cell expansion are carried out to obtain a corresponding GROMACS structure.

Step ②: Optimal force field parameters are selected, and constant-pressure and constant-temperature (NPT) relaxation is carried out on each structure for 1 ns.

Step ③: Relaxed structures are obtained, and conventional molecular dynamics simulation (temperature scanning) is carried out under an NPT ensemble for 5 ns at a series of given temperatures (N=68, 10-350K).

Figure 4:
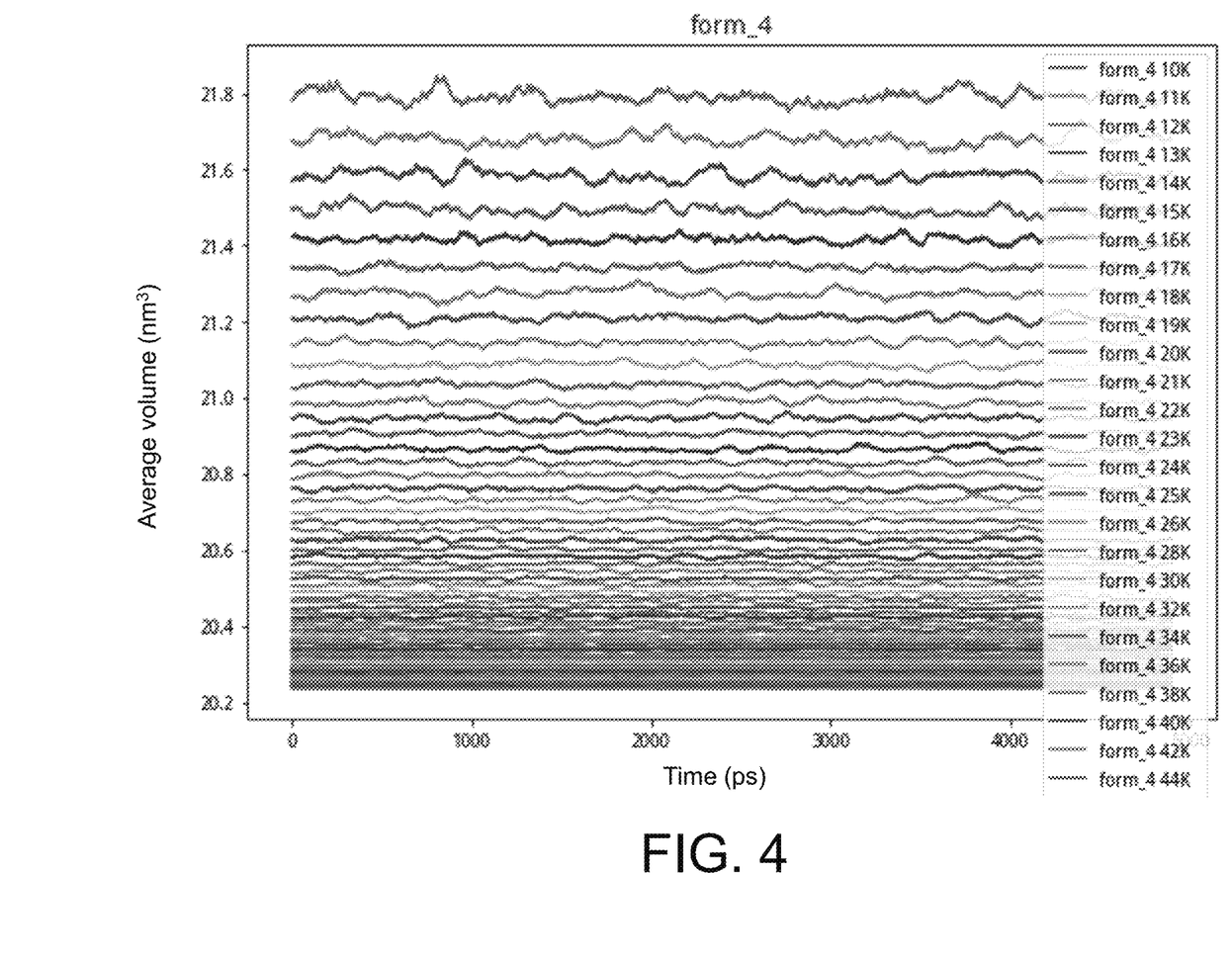
FIG. 4 is a diagram of variations with time of volume, internal energy and the like under different temperatures, curves in this diagram indicate that the temperature is gradually decreased from top to bottom (namely, the temperature is decreased from 350K to 10K from top to bottom), and this diagram is involved in step ④.
Figure 5:
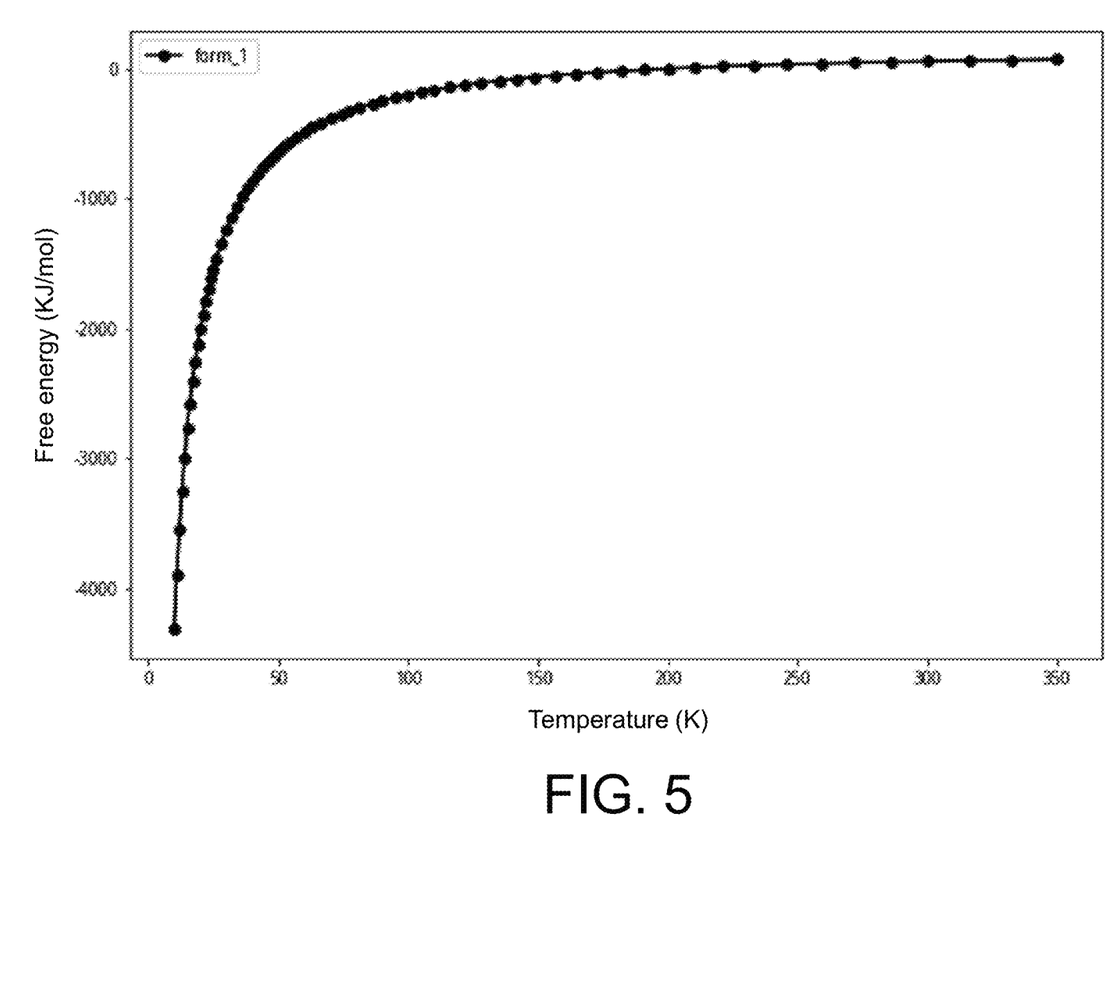
FIG. 5 shows the variations with temperature of volume, internal energy, free energy and the like, and is involved in step ⑤.
Figure 6:
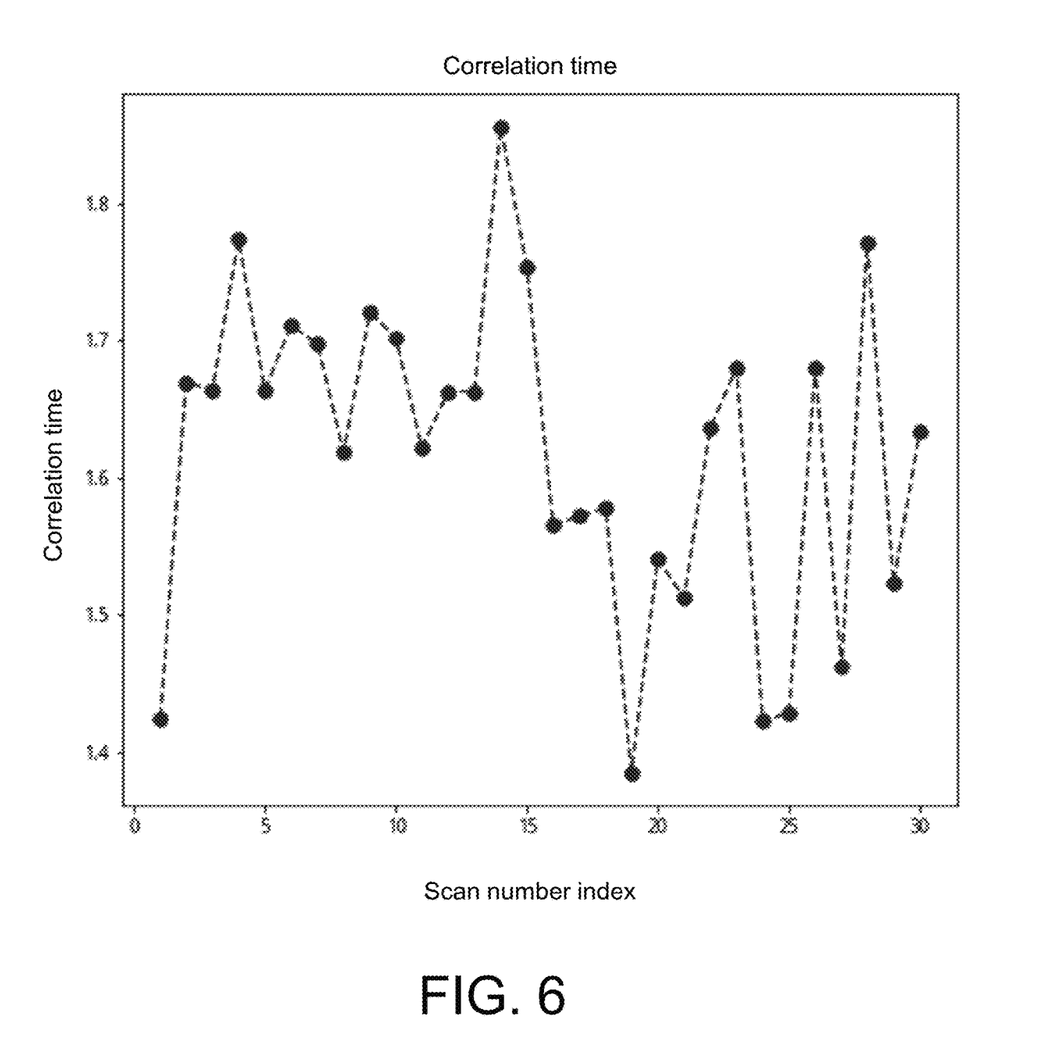
FIG. 6 shows the variation with scan temperature of the correlation time of adjacent replicas (if the correlation time is within 10 s, it indicates that the convergence is good) during convergence analysis for free energy computation and is involved in step ⑤.
Figure 7:
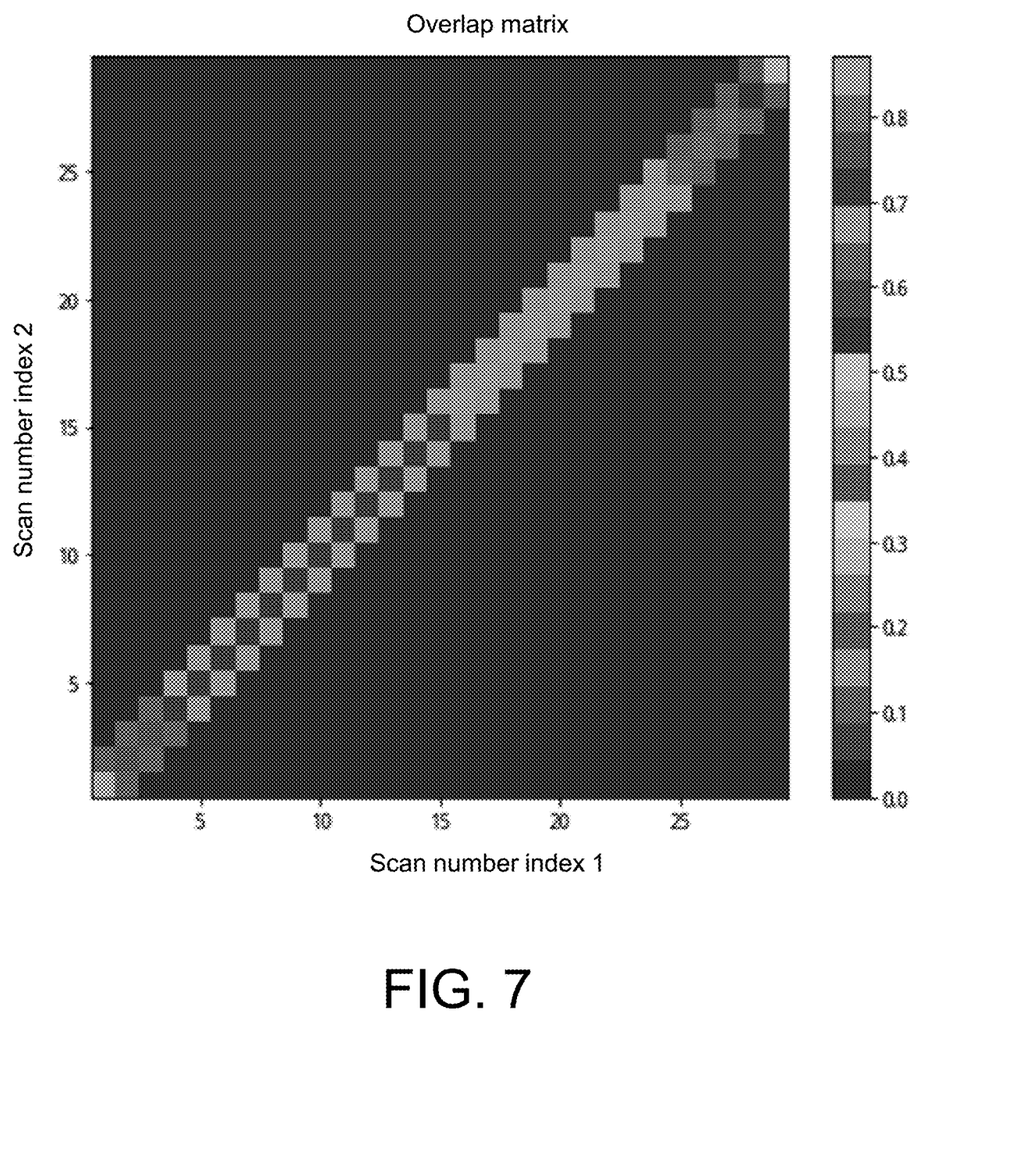
FIG. 7 shows an energy overlap matrix corresponding to different scan temperatures (if the color difference, relative to the overall background, between the previous lattice and the next lattice in the diagonal relationship is large, indicates that overlapping between the adjacent replicas is sufficient) during convergence analysis for free energy computation and is involved in step ⑤.

Step ④: REMD simulation is carried out under the NPT ensemble on final structures subjected to temperature scanning for 5 ns, and the variations with time of common physical and chemical properties are extracted to directly plot, in Jupyter, an evolution landscape of a certain property over time under all the temperatures.

Step ⑤: Curves of variations with temperature of the volume, internal energy and free energy are worked out according to REMD simulation results, the time correlation and overlap matrix between every two adjacent temperatures are calculated while free energy is calculated by MBAR, and all these data are directly plotted as curves in Jupyter for real-time checking and convergence inspection.

Figure 3:
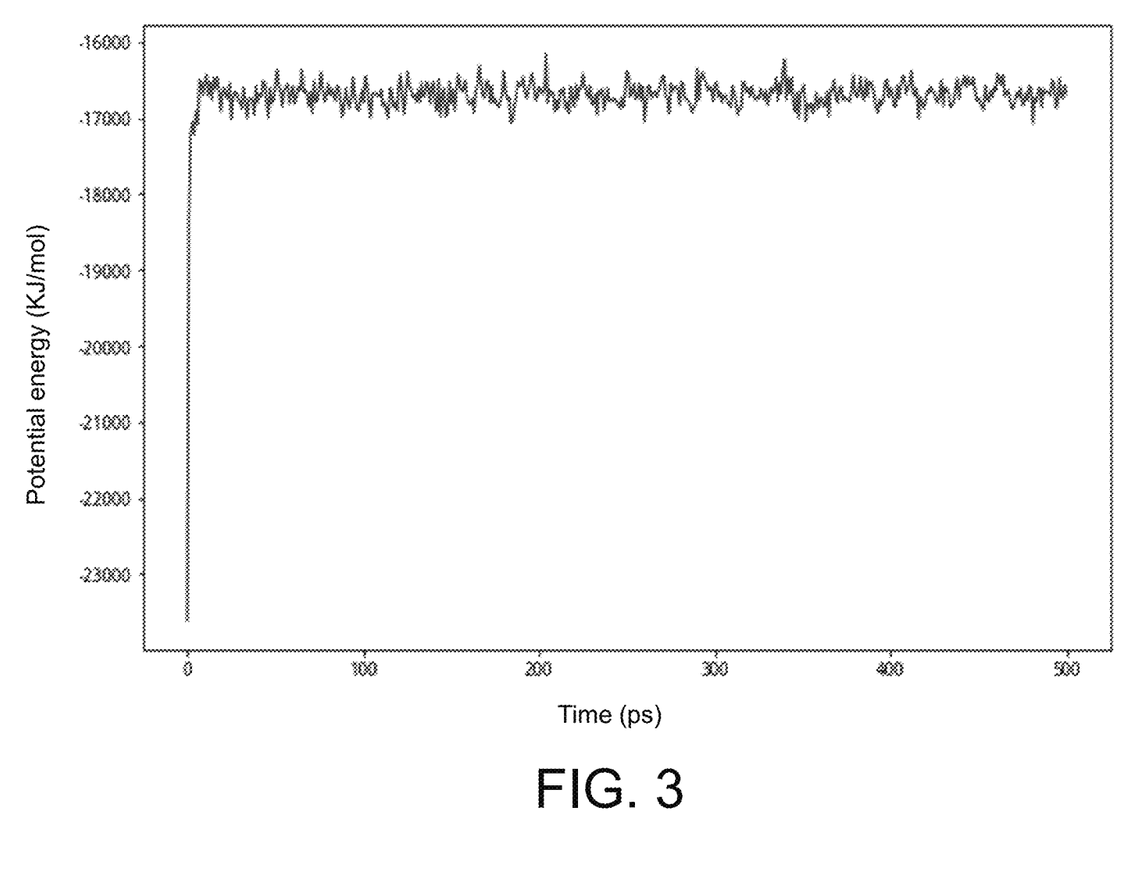
FIG. 3 is a diagram of variations with time of temperature, pressure, volume, energy, RMSD and drift of center of mass in the computation process of MD simulation, and this diagram is used for monitoring convergence and is involved in steps ②, ③, and ④.

In addition, convergence is monitored according to a diagram of variations with time of the temperature, pressure, volume, energy, RMSD, dirft of center of mass and the like in the simulation computing process and is involved in steps ②, ③, ④.

After an initial structure, force field parameters and analog parameters (including step length, duration, temperature range and the like) of all steps are specified, submission only needs to be conducted once in this computation process, and then all subsequent computation and data analysis tasks can be automatically completed; and users can check and modify the execution status of the tasks in Jupyter at any time and can also graphically check computation and analysis results in real time.

The invention is further expounded above in combination with the preferred specific embodiments, but these preferred ones should not be regarded as all possible specific embodiments of the invention. Various simple deductions or substitutes can be made by those ordinarily skilled in this field without deviating from the conception of the invention, and all these deductions or substitutes should also fall within the protection scope of the invention.

What is claimed is:

1. A GROMACS cloud computing process control method, comprising the following steps:
   step (1): acquiring, from ArangoDB, .res or .cif files with crystal structures having energy ranked at the top by cluster ranking, and then importing a yoda library function to carry out symmetric operations, format conversion and unit cell expansion, so that a GROMACS structural file is obtained;
   step (2): acquiring, from ArangoDB, optimized force field parameters obtained by force field development, and then importing the yoda library function to automatically convert the optimized force field parameters into a GROMACS force field parameter file;
   step (3): importing the yoda library function to automatically generate a corresponding GROMACS simulation parameter file according to simulation types in different stages;
   step (4): importing a mixc library function to transmit data to submit GROMACS computation and analysis tasks to a task scheduling platform ;
   step (5): adding a corresponding monitor task for a same batch of tasks for each said structure, and acquiring the execution status of the tasks in real time; and
   step (6): acquiring corresponding analysis results from ArangoDB after all the tasks are executed, and importing a matplotlib library function to directly plot curves corresponding to the analysis results in a development software.

2. The method according to claim 1, wherein task parameters are at least one selected from task type, image name, memory and number of cores.

3. The method according to claim 2, wherein the task type is MD or REMD.

4. The method according to claim 1, wherein in Step (5), the execution status includes at least one selected from DONE, RUNNING, FAILED, IN_PREP, IN_QUEUE, and FALAT.

5. A replica-exchange molecular dynamics process method based on GROMACS cloud computing according to claim 1, comprising the following steps:
- step ①: selecting N low-energy crystal structures from a cluster ranking computation result, and carrying out format conversion and unit cell expansion to obtain a corresponding GROMACS structure;
- step ②: selecting optimized force field parameters, and carrying out constant-pressure and constant-temperature relaxation on each said structure for 1 ns;
- step ③: obtaining relaxed structures, and carrying out, under an NPT ensemble, temperature scanning for conventional molecular dynamics simulation at a series of given temperatures;
- step ④: carrying out REMD simulation under the NPT ensemble on final structures subjected to temperature scanning, and extracting variations with time of common physical and chemical properties to directly plot, in the development software, an evolution landscape of a certain property over time under all the temperatures; and
- step ⑤: working out curves of variations with temperature of a volume, internal energy and free energy according to REMD simulation results, calculating a correlation time and overlap matrix between every two adjacent said temperatures while calculating free energy by using multistate Bennett acceptance ratio method (MBAR), and directly plotting all these data as curves in the development software for real-time checking and convergence inspection.

6. The method according to claim 5, wherein in Step ⑤, convergence is monitored according to a diagram of variations with time of temperature, pressure, volume, energy, RMSD and drift of center of mass in a simulation computing process.

* * * * *